US006719023B2

(12) United States Patent
Kaser et al.

(10) Patent No.: US 6,719,023 B2
(45) Date of Patent: Apr. 13, 2004

(54) APPARATUS FOR PRODUCING RECTANGULAR FURNITURE BOARDS WITH A GLUED-ON EDGE

(75) Inventors: Hans Kaser, Aichkirchen (AT); Gerhard Pittrich, Wallern an der Trattnach (AT)

(73) Assignee: Paul Ott GmbH (AT)

( * ) Notice: Subject to any disclaimer, the term of this patent is extended or adjusted under 35 U.S.C. 154(b) by 0 days.

(21) Appl. No.: 10/136,489

(22) Filed: May 2, 2002

(65) Prior Publication Data

US 2002/0162603 A1 Nov. 7, 2002

(30) Foreign Application Priority Data

May 3, 2001 (DE) .................................... 201 07 572 U

(51) Int. Cl.[7] .......................... B27M 1/08; B23Q 15/00; B27G 11/00

(52) U.S. Cl. ......................... 144/382; 144/2.1; 144/3.1; 144/346; 144/356; 144/402; 156/304.1; 156/304.5

(58) Field of Search .......................... 144/2.1, 3.1, 344, 144/345, 346, 382, 392, 394, 402, 356; 156/475, 304.1, 304.5, 349

(56) References Cited

U.S. PATENT DOCUMENTS 4,342,615 A * 8/1982 Koch, II ..................... 156/563
5,246,533 A * 9/1993 Mochizuki .................. 156/475

FOREIGN PATENT DOCUMENTS

| | | |
|---|---|---|
| DE | 1 208 470 | 1/1966 |
| DE | 1 220 108 | 6/1966 |
| EP | 0 578 199 A1 | 1/1994 |
| EP | 0 728 561 A1 | 8/1996 |

* cited by examiner

*Primary Examiner*—W. Donald Bray
(74) *Attorney, Agent, or Firm*—Rothwell, Figg, Ernst & Manbeck, PC

(57) ABSTRACT

Apparatus for producing rectangular furniture boards with a glued-on edge, in which the following are arranged one after another in the passage direction:

- a longitudinal sawing device (14), which divides a rectangular initial board (12) into a plurality of parallel longitudinal boards (12*a*, 12*b*, 12*c*, 12*d*),
- a longitudinal gluing device (31), which in each case glues a longitudinal edge onto both longitudinal sides of a longitudinal board (12*a*) passing through and machines the edge,
- a transverse sawing device (38), which divides a longitudinal board (12*a*) transversely with respect to its longitudinal direction into furniture boards (39) with a predetermined size,
- a transverse gluing device (40), which in each case glues a transverse edge onto both transverse sides of a furniture board (39) passing through and machines this edge.

9 Claims, 4 Drawing Sheets

APPARATUS FOR PRODUCING RECTANGULAR FURNITURE BOARDS WITH A GLUED-ON EDGE

BACKGROUND OF THE INVENTION

1. Field of the Invention

The invention relates to an apparatus for producing rectangular furniture boards, which are sawn from an initial board and onto which an edge is glued.

2. Description of the Related Art

In order to produce such furniture boards, production centres are known which comprise a board saw, an edge gluing machine and a CNC drilling machine. The plate saw cuts furniture boards from a large-format initial board in accordance with a preprogrammed cutting plan. After the job of the plate saw has been completed, a bar code, which contains information, is applied to the respective furniture boards.

After being cut to size by the board saw, the furniture boards are passed on by an operator, in an uncoordinated manner and generally manually, to the edge gluing machine, which is loaded manually.

In the edge gluing machine, the edges of the workpieces exposed by the dividing cut in the board saw are provided with an appropriate edge and these edges are finally machined. As a rule, all four sides are provided with edges, which are to some extent also different, so that it is necessary to pass through the edge gluing machine four times. In the worst case, therefore, the cut edges of all four sides have to be provided with appropriate bar codes. In the case of manual loading, this leads to complications and to a slowing of the sequence. Since the workpieces also have to be removed manually at the outlet of the edge gluing machine or transported back to the operator via a return system, a coordinated and automated sequence in the case of a plurality of different board sizes and edging materials is possible only with great difficulty. The known apparatus is therefore primarily suitable for machining parts which are as standard as possible. The finally edged parts are then stacked on suitable aids, such as pallets and the like. Some of these boards are then passed onto the CNC drilling machine, in which the boards are provided with holes. By means of reading bar codes on the workpiece, an appropriate program can be activated. However, inserting the workpieces into the CNC drilling machine and removing them is likewise carried out manually.

Furthermore, large systems for producing furniture boards are known, which likewise in principle have three machining machines, namely a board saw, an edge gluing machine and a CNC drilling machine with a high efficiency. The board saw saws workpieces of equal size from large-format initial boards, the said workpieces then being supplied via a transfer device to a double-sided edge gluing machine, which in each case carries out two edging operations in one pass. Because of the efficient processing apparatuses, it is possible to operate with a high passage speed. The processing apparatuses are set up on line by means of appropriate programmes or directly by an operator. This is tolerable in the case of large mass production. However, in the case of small batch sizes, large systems are not profitable.

In addition to the extremely high space requirement and the investment costs, a high outlay on set-up when changing over to other jobs primarily has a negative effect. Furthermore, automation that is flexible and provided with logistic intelligence is not provided, since these systems are aimed at large mass production from the start.

SUMMARY OF THE INVENTION

The invention is based on the object of providing a flexible apparatus for producing rectangular furniture boards with a glued-on edge whose operation can be automated in a straightforward manner.

This object is achieved by an apparatus having the features of claim 1. Advantageous embodiments of the apparatus according to the invention form the subject matter of claims 2 to 5.

The apparatus according to the invention offers the possibility of automating the operating sequence thoroughly. This encompasses the planning, the design, the job processing, the machine control, the operating sequence optimization, the data processing for recalculation and capacity calculations. By means of automatic sequence optimization within the apparatus, a very flexible production facility is achieved. Only a minimum number staff is required. In addition, the space required for the machining and the transport within the apparatus is low.

Particular flexibility is achieved by the transverse gluing device for gluing on and machining one of the transverse edges having a plurality of machining stations which are arranged one after another in the passage direction and can be fed in independently of one another transversely with respect to the passage direction of the final board. The individual machining stations are, for example, a joining station, a capping station, a milling station and a corner rounding station. The ability to feed them in independently makes it possible for a workpiece of a specific size to be machined in the joining station, for example, while another workpiece of a different size is being machined in the capping station.

The apparatus preferably has a control device, into which operating jobs for producing boards with a specific size and specific edges are entered. Stored in the control device is optimization software which, by using the operating jobs, controls the longitudinal sawing device, the longitudinal gluing device, the transverse sawing device and the transverse gluing device in such a way that the optimum machining performance is achieved with minimum consumption of material. A CNC drilling machine following the transverse gluing device can also be controlled by the control device.

Still greater flexibility is achieved if the longitudinal gluing device and the transverse gluing device each have a plurality of edge magazines with different edges, which are chosen by the control device as required. The longitudinal gluing device and the transverse gluing device can in each case have a plurality of gluing stations with different adhesives, which are likewise chosen by the control device as required.

BRIEF DESCRIPTION OF THE SEVERAL VIEWS OF THE DRAWINGS

An exemplary embodiment of the invention will be explained in more detail below using drawings, in which.

DETAILED DESCRIPTION OF THE PREFERRED EMBODIMENTS

Figure 1:
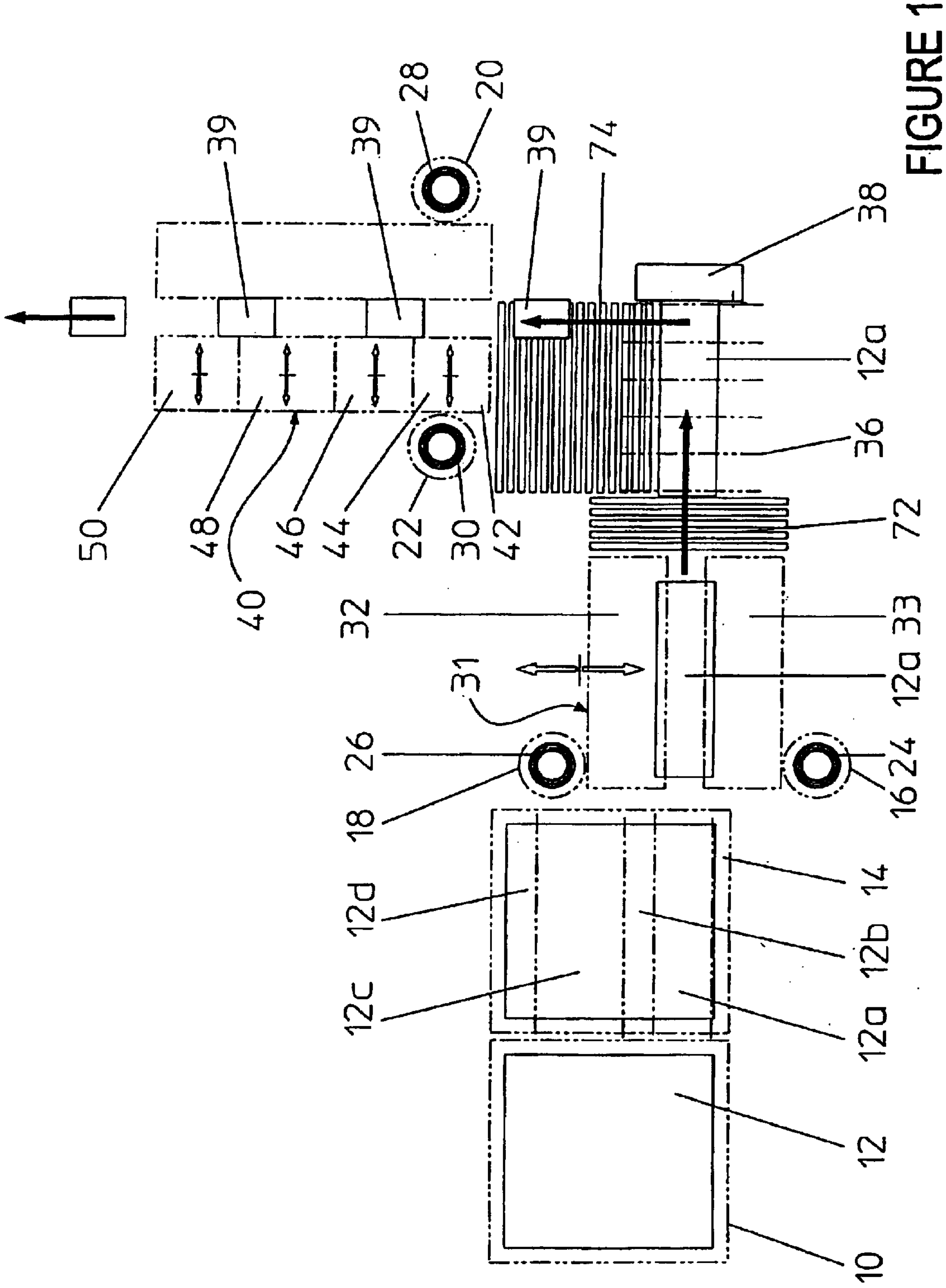
FIG. 1 shows a plan view of an apparatus for producing furniture parts.

As FIG. 1 shows, the apparatus for producing rectangular furniture boards has a board magazine 10, a longitudinal sawing device 14, a longitudinal gluing device 31, a transverse sawing device 38 and a transverse gluing device 40, which are arranged one after another in the passage direction of a workpiece. Between the individual devices, transport apparatuses (not shown) are provided, which transport a workpiece from one device to the next.

In the board magazine 10, a number of large-format rectangular initial boards, for example particle boards 12, are stored one above another. The board magazine 10 is followed by the longitudinal sawing device 14, in which in each case an initial board 12 from the board magazine 10 is deposited. In the longitudinal sawing device 14, the initial board 12 is divided up in the longitudinal direction, that is to say in the passage direction, into a plurality of longitudinal boards 12*a*, 12*b*, 12*c*, 12*d*.

The longitudinal sawing device 14 is followed in the passage direction by the longitudinal gluing device 31, which comprises two longitudinal gluing units 32, 33 which are arranged in mirror-image fashion, in each case glue a longitudinal edge 24 and 26 onto a longitudinal side of a longitudinal board 12*a* sawn in the longitudinal sawing device 14 and machine the said longitudinal edge. In order to adapt to the width of a longitudinal board 12*a* passing through, the upper longitudinal gluing unit 32 in FIG. 1 can be adjusted perpendicular to the passage direction.

Figure 2:
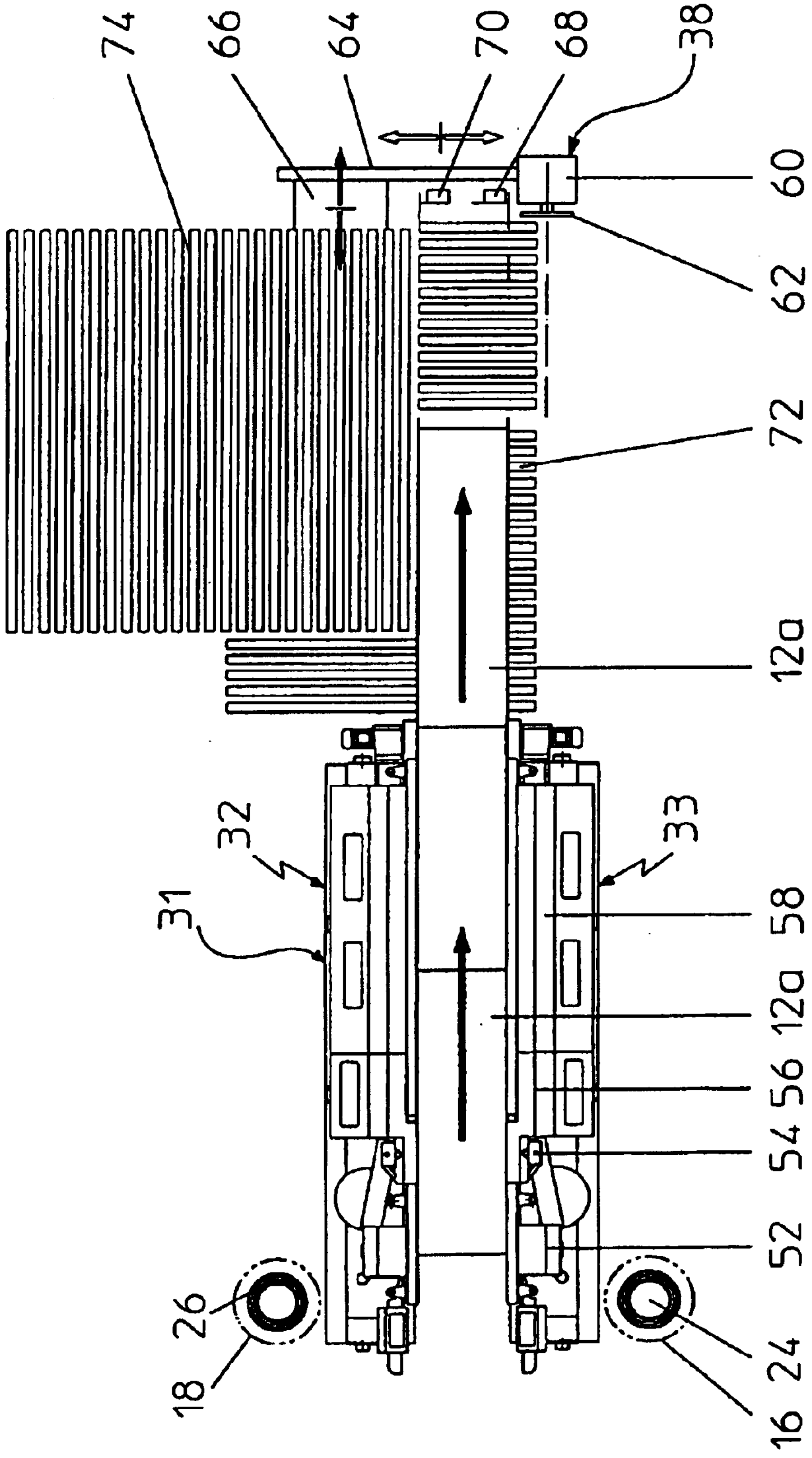
FIG. 2 shows the apparatus from FIG. 1 in the area of a longitudinal gluing device and a following transverse sawing device in the initial position.
Figure 3:
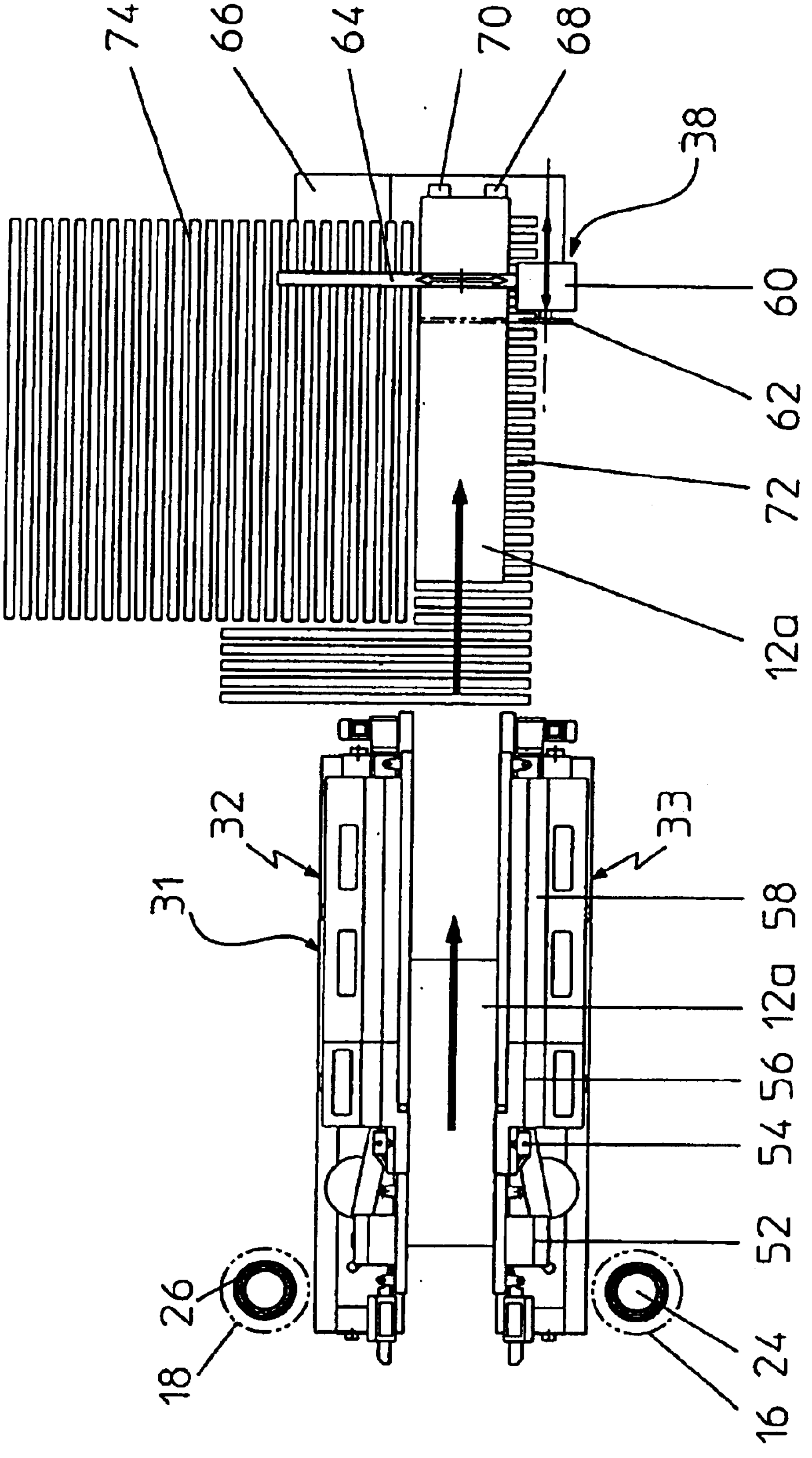
FIG. 3 shows the apparatus from FIG. 1 in the area of a longitudinal gluing device and a following transverse sawing device in the sawing position.

As FIG. 2 shows, each longitudinal unit 32, 33 of the longitudinal gluing device 31 has, one after another in the passage direction, a joining device 52, a gluing device 54 with edge feed and pressure zone, a premilling device 56 and a precision milling device 58. The gluing device 54 in each case glues an edge 24 and 26, respectively, supplied from an edge magazine 16, 18, onto a longitudinal side of a longitudinal board 12*a* passing through. The edge glued on is machined by the premilling device 56 and the precision machining device 58.

After emerging from the longitudinal gluing device 31, the longitudinal board 12*a* is transferred over a roller table 72 to a transverse sawing device 38. The transverse sawing device 38 has two stops 68, 70, which the longitudinal board 12*a* strikes in order to be machined. The stop 68 is fitted in a fixed location, while the stop 70 is adjustable at right angles to the longitudinal direction of the longitudinal board 12*a* in order to match the width of the longitudinal board 12*a*.

The transverse sawing device 38 has a transverse sawing unit 60 with a three-phase motor, to whose shaft a circular saw blade 62 is fitted, the plane of the latter running transversely with respect to the longitudinal direction of the longitudinal board 12*a*. The transverse sawing unit 60 can be displaced in the longitudinal direction of the longitudinal board 12*a* by means of a longitudinal guide 66, and transversely with respect to the longitudinal direction of the longitudinal board 12*a* by means of a transverse guide device 64.

In the transverse sawing device 38, the longitudinal board 12*a* is cut through in the transverse direction at the dividing lines 36 indicated by dashed lines in FIG. 1. For this purpose, the transverse sawing unit 60 is moved firstly in the longitudinal direction at the height of the corresponding dividing line and then moved transversely with respect to the longitudinal direction of the longitudinal board 12*a*, the longitudinal board 12*a* being divided through in the transverse direction. The severed furniture board 39 is then conveyed at right angles to the longitudinal direction of the longitudinal board 12*a*, over a roller table 74, in the direction of the transverse gluing device 40, and the remaining part of the longitudinal board 12a is transported onward until it strikes the stops 68, 70. The next saw cut along a dividing line 36 on the longitudinal board 12*a* is then carried out.

At the same time, the severed furniture board 39 is conveyed into the transverse gluing device 40. As shown in particular in FIG. 4, the transverse gluing device 40 has two transverse gluing units 41, 43, each of which is associated with a transverse edge (with respect to the longitudinal board 12*a*). The passage direction through the transverse gluing device 40 runs at right angles to the passage direction of the longitudinal board 12*a* through the longitudinal gluing device 31 into the transverse sawing device 38.

Figure 4:
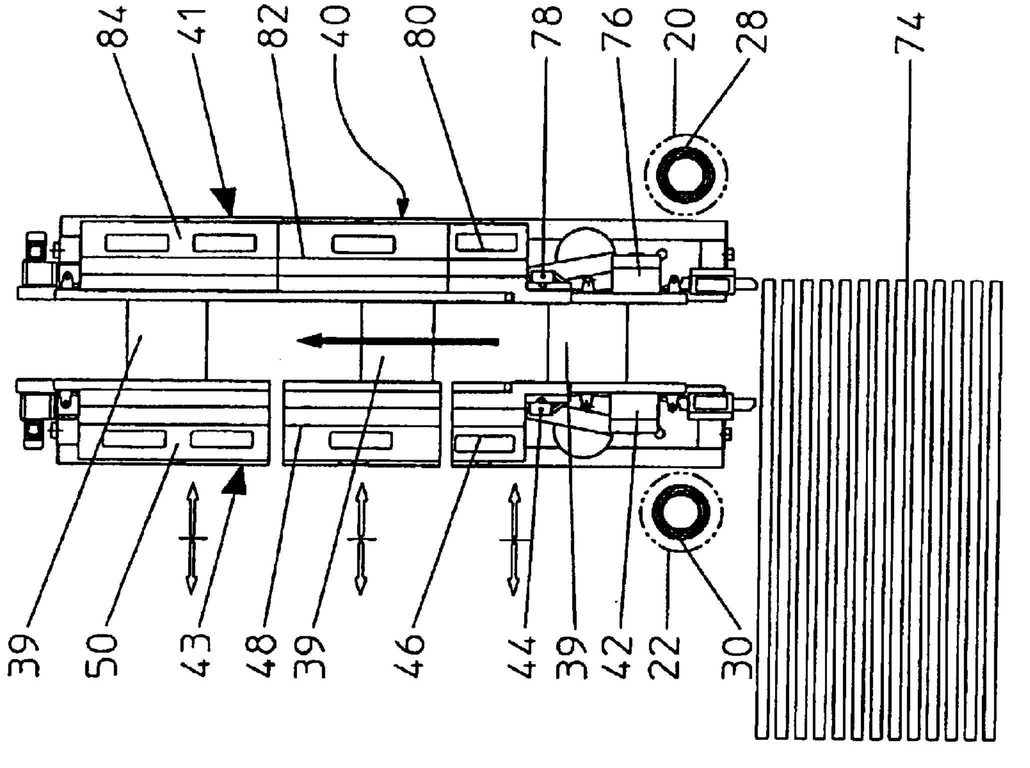
FIG. 4 shows the apparatus from FIG. 1 in the area of a transverse gluing device.

The transverse gluing unit 41 shown on the right in FIG. 4 is arranged in a fixed location. It has, one behind another in the passage direction, a joining device 76, a gluing device 78, a capping device 80, a milling device 82 and a comer rounding device 84. The gluing device 78 is supplied with an edge 28 from an edge magazine 20. The machining plane of the transverse gluing unit 41 is flush with the stop plane of the stops 68, 70 of the transverse sawing device 38.

The left-hand transverse gluing unit 43 likewise has a joining device 42, a gluing device 44, a capping device 46, a milling device 48 and a corner rounding device 50, which are arranged opposite the corresponding devices belonging to the transverse gluing unit 41. In order to match the width of a furniture board 39, the joining device 42, together with the gluing device 44 and the capping device 46, the milling device 48 and the corner rounding device 50, can be adjusted independently of one another at right angles to the passage direction.

During the passage of a furniture board 39 through the transverse gluing device 40, first of all an edge 20 and 30, respectively, is glued onto each side of the furniture board 39 by the gluing devices 78, 44. Then, the edge sections projecting at the ends are capped by the capping devices 80, 46. The edges are then milled by the milling devices 82, 48. Finally, the corners are rounded by the comer rounding devices 84, 50.

After leaving the transverse gluing device 40, the furniture boards are supplied to a CNC drilling device (not shown), in which holes for the installation or for the accommodation of installed parts are provided.

Since the joining device 42 together with gluing device 44 and the capping device 46, the milling device 48 and the comer rounding device 50 can be adjusted independently of one another transversely with respect to the passage direction of the furniture board 39, it is possible to machine a furniture board 39 with a specific size by means of the joining devices 42, 76, the gluing devices 44, 78 and the capping devices 46, 80, while other furniture boards 39 with a different size can be machined by the milling devices 48, 82 and the comer rounding devices 50, 84. This increases the flexibility.

All devices belonging to the apparatus according to the invention for producing rectangular furniture boards are coordinated and controlled by means of a control device (not shown), depending on the operating jobs entered into the control device. The data required for the production are stored in the control device for all the machining steps and stations, respectively. By means of dedicated optimization software, the individual sequences in the corresponding devices are activated.

In addition to automation and monitoring, this sequence permits a very efficient production operation with good passage speeds. This is achieved in that the parts with a standardized width dimension and provided with a standard edge are combined in terms of length, and the respective part with the total length is severed from the large-format initial board at the longitudinal cutting device 14. Edging in the longitudinal gluing device 31 on a continuous board length of 2.8 m, for example, is significantly faster than edging, for example, seven individual parts with lengths of 0.20 to 1 m, for example, since these parts would have to be transported individually and machined with a consequent spacing between the individual parts. Only during the subsequent transverse division in the transverse sawing device 38 are these individual dimensions considered and the longitudinal boards 12*a* appropriately cut to length. As a result of the division by machine in the longitudinal gluing device 14 and transverse gluing device 40, although in total more individual units are needed than, for example, in the case of a double-sided edge gluing machine, as a result of the lower passage speeds at the same capacity, these individual units can be designed significantly more simply, that is to say shorter and more cost-effectively.

Still greater flexibility is achieved if the longitudinal gluing device 14 and the transverse gluing device 40 each have a plurality of edge magazines 16, 18, 22, 28 with different edges, which can be chosen by the control device as required. In addition, in each case a plurality of gluing stations can be provided with different adhesives, which are likewise chosen by the control device as required.

What is claimed is:

1. An apparatus for producing rectangular furniture boards with a glued-on edge, comprising:

a longitudinal sawing device (14), which divides a rectangular initial board (12) into a plurality of parallel longitudinal boards (12*a*, 12*b*, 12*c*, 12*d*), a longitudinal gluing device (31) disposed following said longitudinal sawing device (14) to receive said plurality of parallel longitudinal boards (12*a*, 12*b*, 12*c*, 12*d*) and, glue a first and a second longitudinal edges onto a first and a second longitudinal sides of each of said longitudinal boards (12*a*) and machines said first and said second longitudinal edges, a transverse sawing device (38) disposed following said longitudinal gluing device (31) to receive said plurality of parallel longitudinal boards (12*a*, 12*b*, 12*c*, 12*d*) and, divide each of said longitudinal boards (12*a*, 12*b*, 12*c*, 12*d*) transversely with respect to it's a longitudinal direction into furniture boards (39), each of said furniture boards (39) having with a predetermined size, a transverse gluing device (40), disposed following said transverse sawing device (38) to receive said plurality of parallel longitudinal boards (12*a*, 12*b*, 12*c*, 12*d*) and, glue a first and a second transverse edges onto a first and a second transverse sides of each of said furniture boards (39) and machines said first and said second transverse edges.

2. The apparatus according to claim 1, wherein the transverse gluing device (40) comprises machining stations (42, 44, 46, 48, 50); said machining stations (42, 44, 46, 48, 50) being arranged one after another in direction of passage of said furniture board (39);

said machining stations (42, 44, 46, 48, 50) being fed independently of one another; and said machining stations (42, 44, 46, 48, 50) being fed transversely with respect to the direction of passage of the furniture board (39).

3. The apparatus according to claim 1, comprising further a control device, into which operating jobs can be entered;

said control device comprising optimization software stored in the control device;

wherein said control device controls the longitudinal sawing device (14), the longitudinal gluing device (31), the transverse sawing device (38) and the transverse gluing device (40) as a function of the operating jobs.

4. The apparatus according to claim 3, characterized in that the longitudinal gluing device (31) and the transverse gluing device (40) each have a plurality of edge magazines (16, 18, 20, 22) which can be chosen by the control device as required.

5. The apparatus according to claim 3, characterized in that the longitudinal gluing device (31) and the transverse gluing device (40) each have a plurality of gluing stations which can be chosen by the control device as required.

6. The apparatus according to claim 4, characterized in that the longitudinal gluing device (31) and the transverse gluing device (40) each have a plurality of gluing stations which can be chosen by the control device as required.

7. The apparatus according to claim 2, comprising further a control device, into which operating jobs can be entered;

said control device comprising optimization software stored in the control device;

wherein said control device controls the longitudinal sawing device (14), the longitudinal gluing device (31), the transverse sawing device (38) and the transverse gluing device (40) as a function of the operating jobs.

8. The apparatus according to claim 7, characterized in that the longitudinal gluing device (31) and the transverse gluing device (40) each have a plurality of gluing stations which can be chosen by the control device as required.

9. The apparatus according to claim 8, characterized in that the longitudinal gluing device (31) and the transverse gluing device (40) each have a plurality of gluing stations which can be chosen by the control device as required.

* * * * *